US008275812B2

United States Patent
Kawachiya et al.

(10) Patent No.: US 8,275,812 B2
(45) Date of Patent: Sep. 25, 2012

(54) METHOD TO REDUCE WASTED CHARACTER DATA AREAS OF JAVA STRINGS

(75) Inventors: Kiyokuni Kawachiya, Yokohama (JP); Kazunori Ogata, Fujisawa (JP); Tamiya Onodera, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/469,481

(22) Filed: May 20, 2009

(65) Prior Publication Data

US 2010/0235412 A1 Sep. 16, 2010

(51) Int. Cl.
*G06F 17/00* (2006.01)
(52) U.S. Cl. ........................... 707/813; 707/769
(58) Field of Classification Search .................. 707/813, 707/769
See application file for complete search history.

(56) References Cited

U.S. PATENT DOCUMENTS 4,876,541 A * 10/1989 Storer .............................. 341/51

FOREIGN PATENT DOCUMENTS

JP 2003241967 A 8/2003

OTHER PUBLICATIONS

Vladimir Roubtsov, "Manande, Tuskatte, Level-up (Learn and use for improvement)" Java Tips Kobo, Java World, Japan, IDG Japan, Inc., Jan. 1, 2004, vol. 8, No. 1, pp. 93 to 100.

* cited by examiner

*Primary Examiner* — Belix M Ortiz Ditren
(74) *Attorney, Agent, or Firm* — Ido Tuchman; William J. Stock

(57) ABSTRACT

A string handling method, program, and information processing apparatus capable of reducing the amount of data stored in a storage. An information processing apparatus handles strings. The information processing apparatus includes a storage storing a group of strings including a plurality of strings each of which consists of a plurality of pieces of character data, a reference section which refers to a particular string in the group of strings, a character data detecting section which detects character data that is not referenced as the particular string in the group of strings, and a character data deleting section which deletes the detected character data from the group of strings.

8 Claims, 14 Drawing Sheets

[Figure 1]
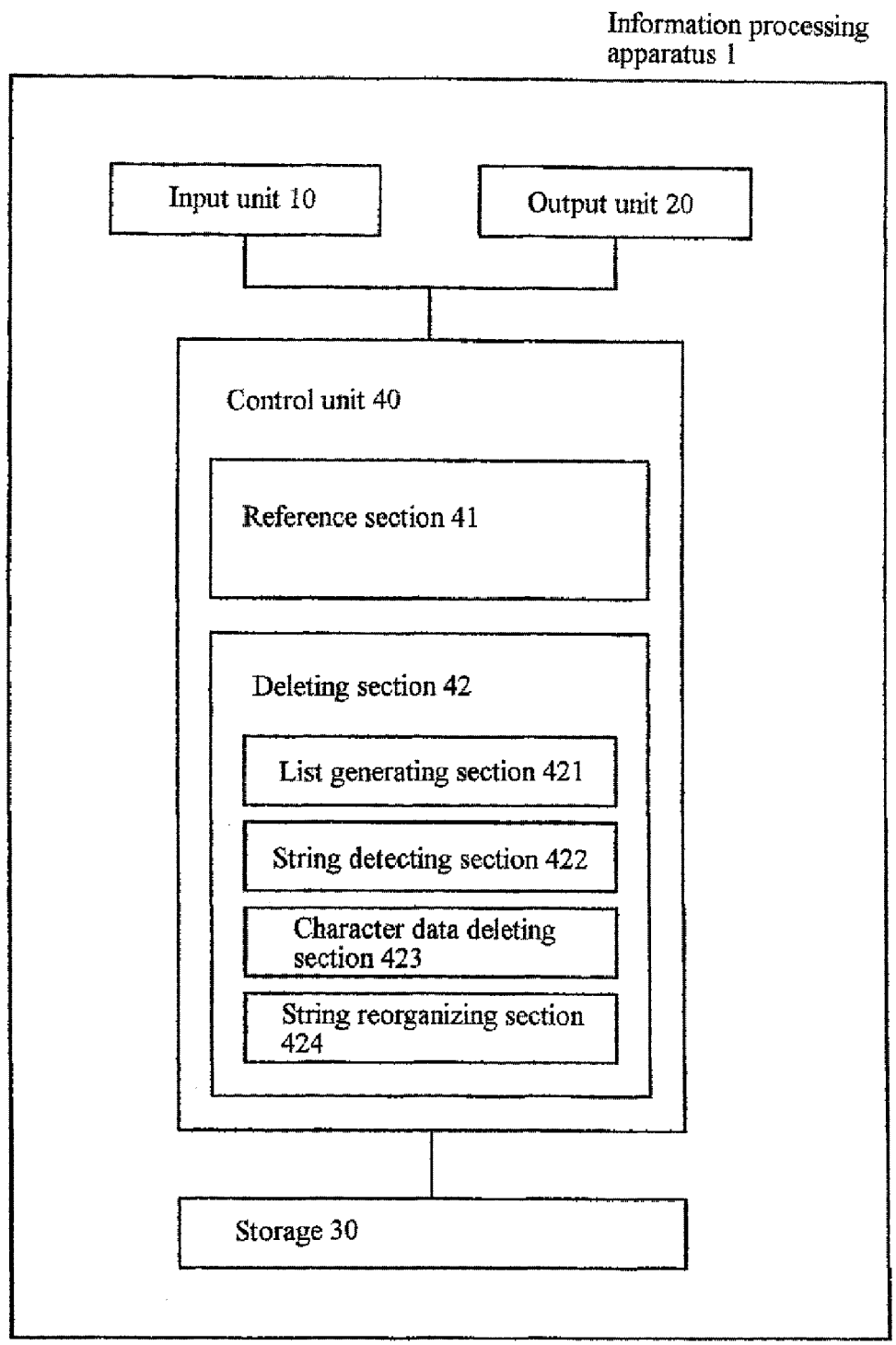

[Figure 2]

CHARS ch-A[ ]  [0] [1] [2] [3] [4] [5] [6] [7] [8] [9] [10][11][12][13][14][15]
| (header) | | | | | i | m | p | o | r | t | a | n | c | e | | | ch-B[ ]  [0] [1] [2] [3] [4] [5] [6] [7] [8] [9] [10][11][12][13]
| (header) | | i | m | p | o | r | t | a | n | c | e | | | ch-C[ ]  [0] [1] [2] [3] [4] [5] [6]
| (header) | | p | o | r | t | | ch-D[ ]  [0] [1] [2] [3] [4] [5] [6] [7] [8] [9] [10]
| (header) | | | | i | m | p | o | r | t | | ch-E[ ]  [0] [1] [2] [3] [4] [5] [6] [7] [8] [9] [10][11][12]
| (header) | | | | | p | o | r | t | a | l | | |

[Figure 3]
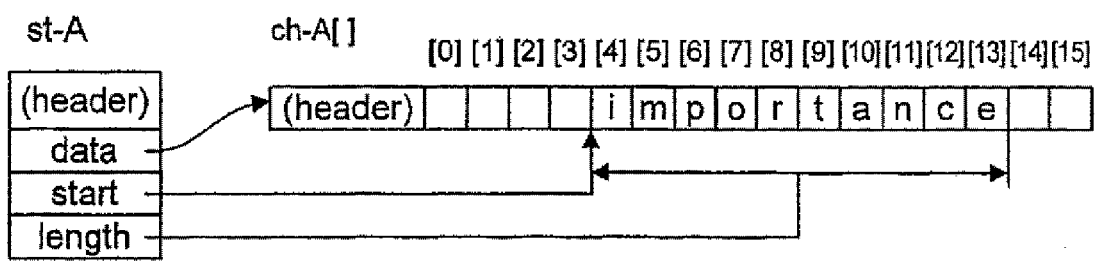
[Figure 4]
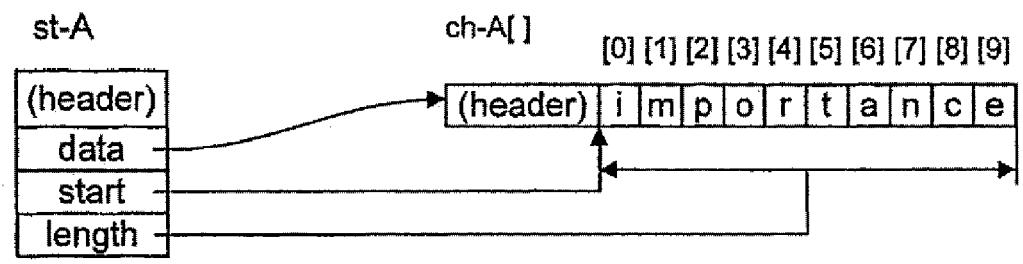

[Figure 5]
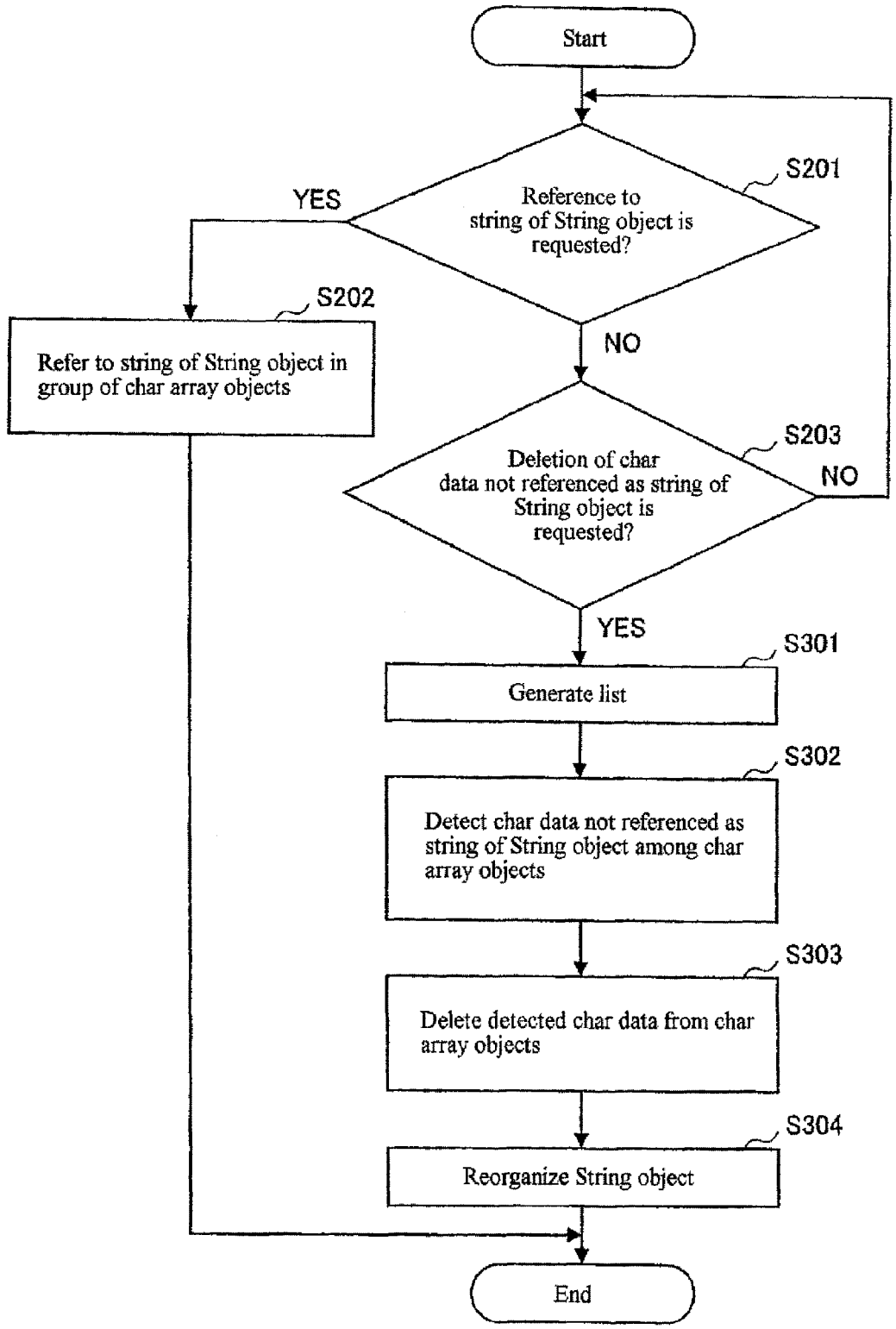

[Figure 6]
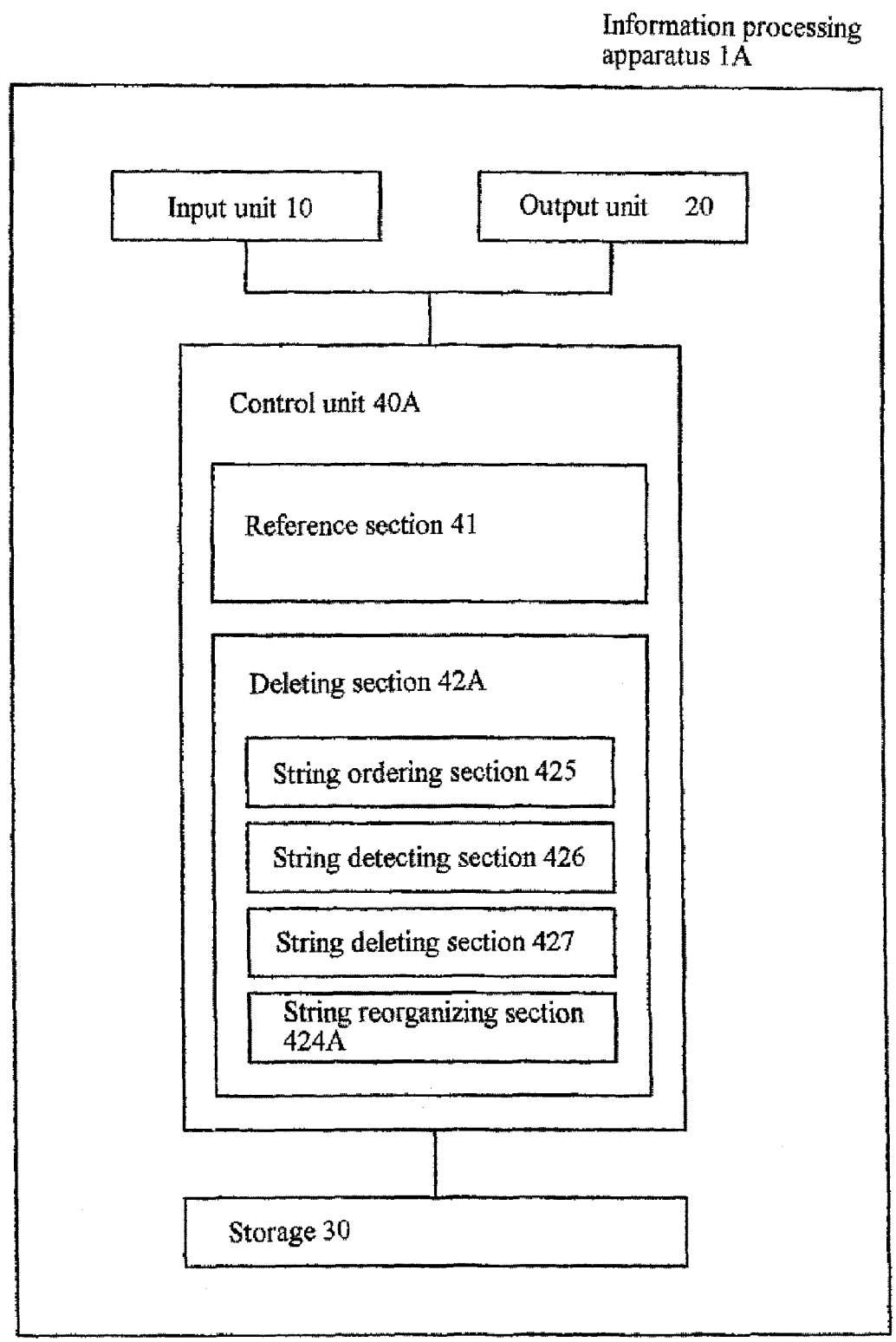

[Figure 7]
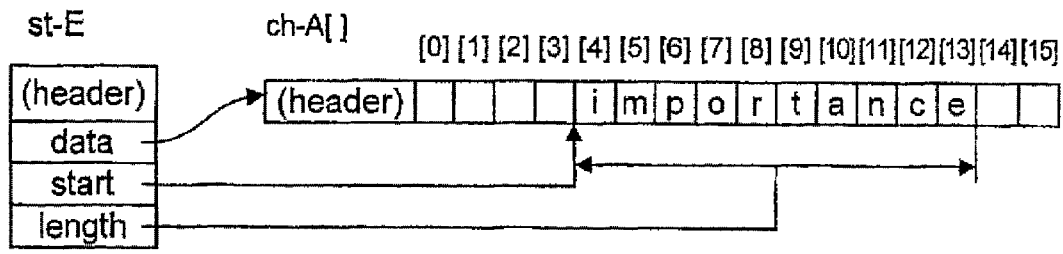
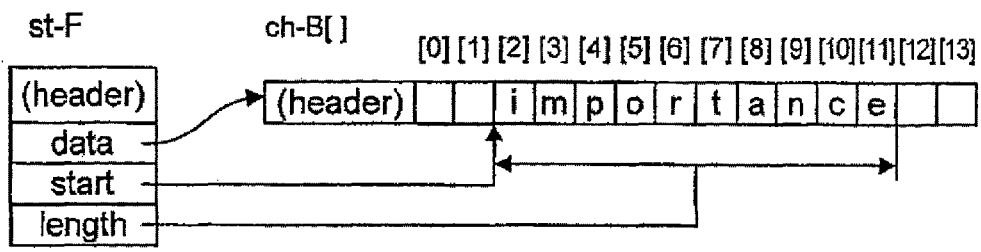
[Figure 8]
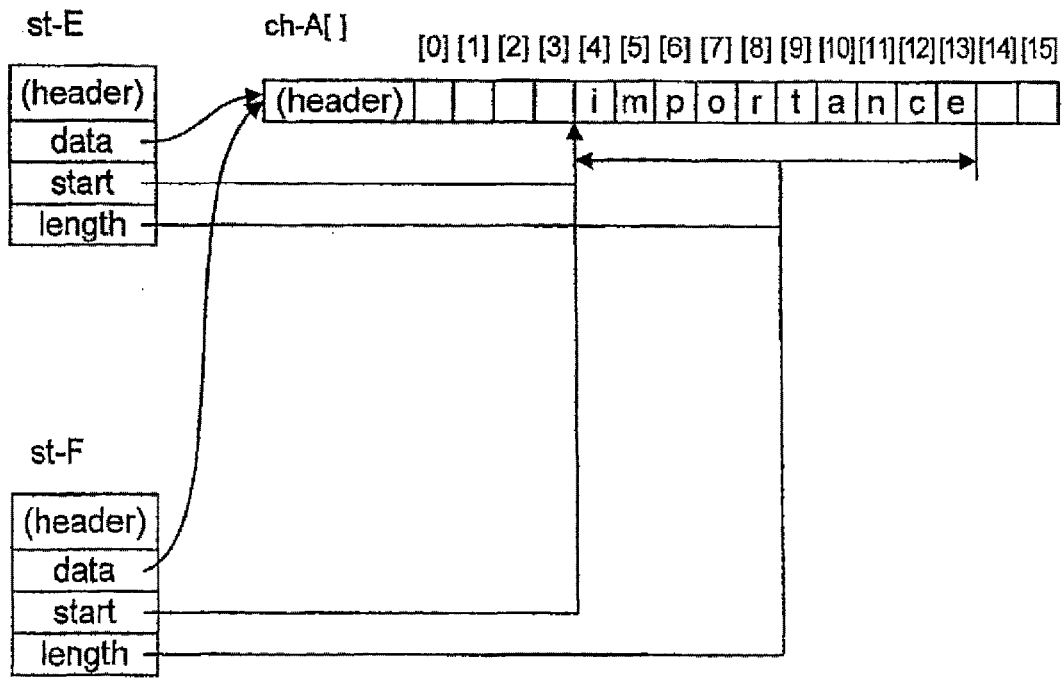

[Figure 9]
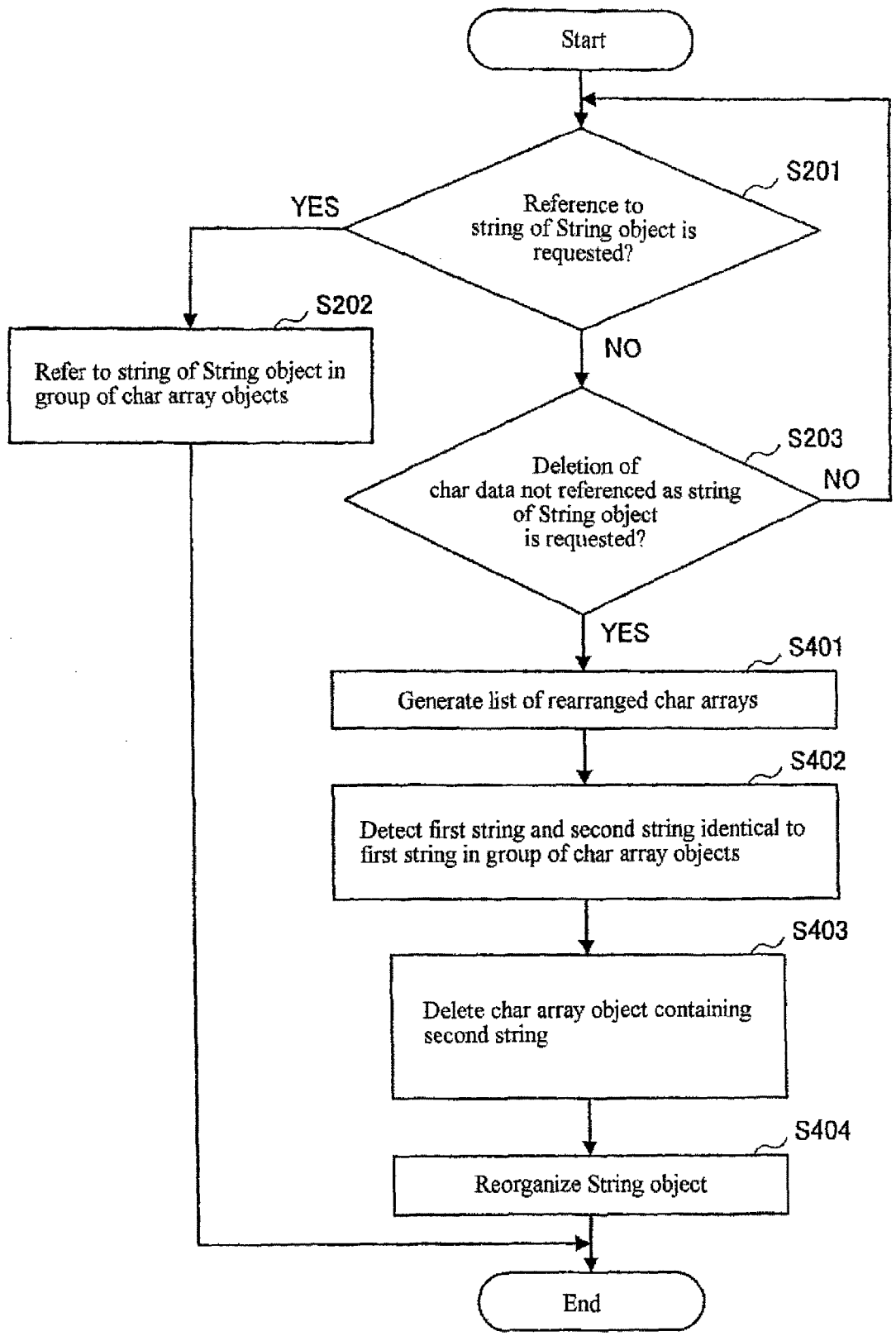

[Figure 10]
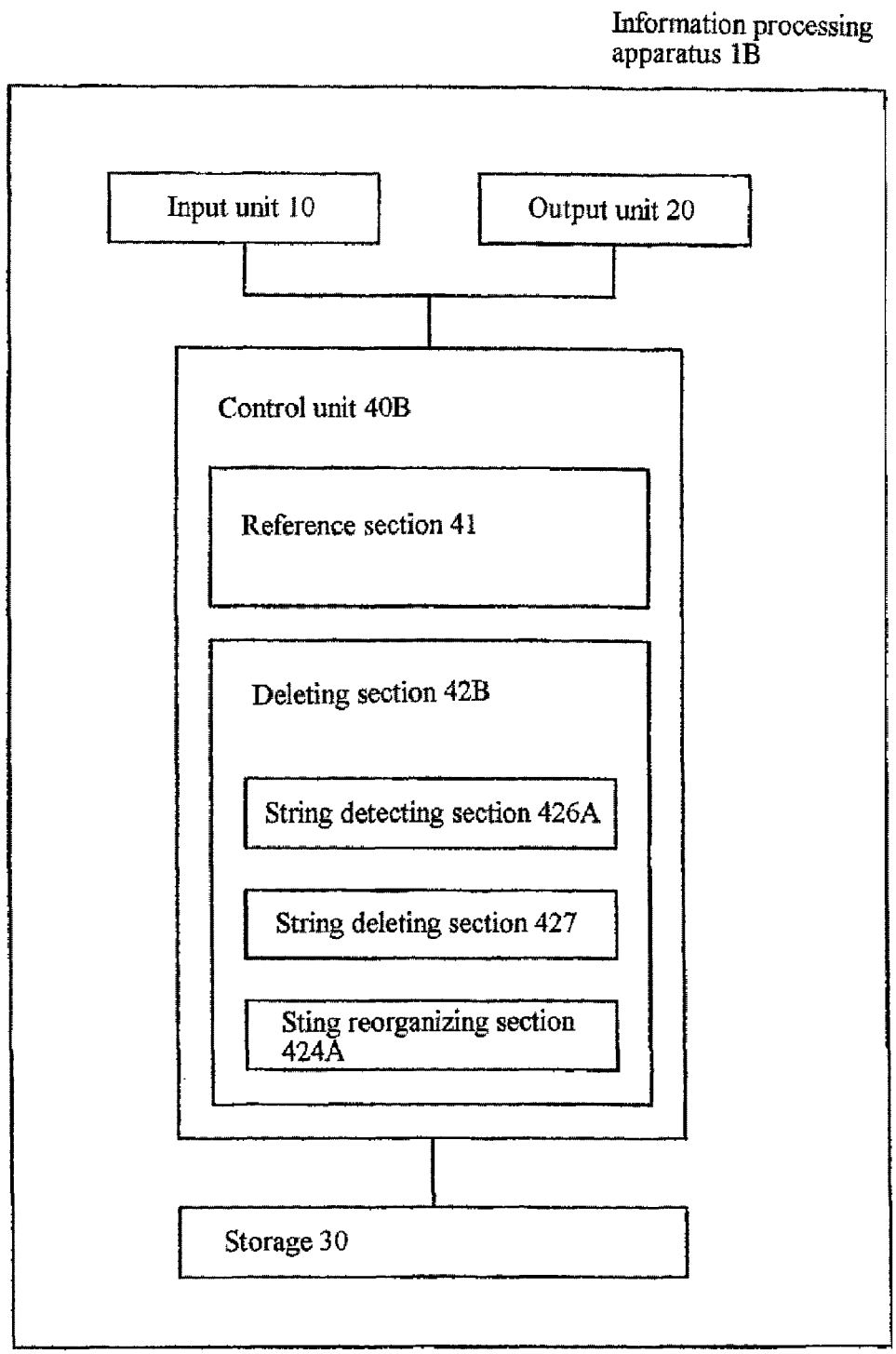

[Figure 11]
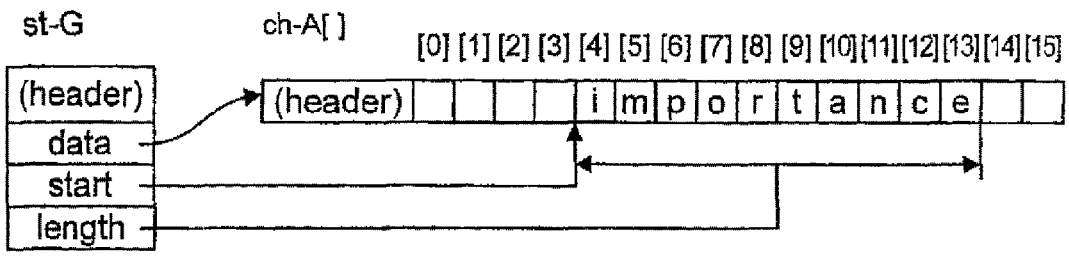
[Figure 12]
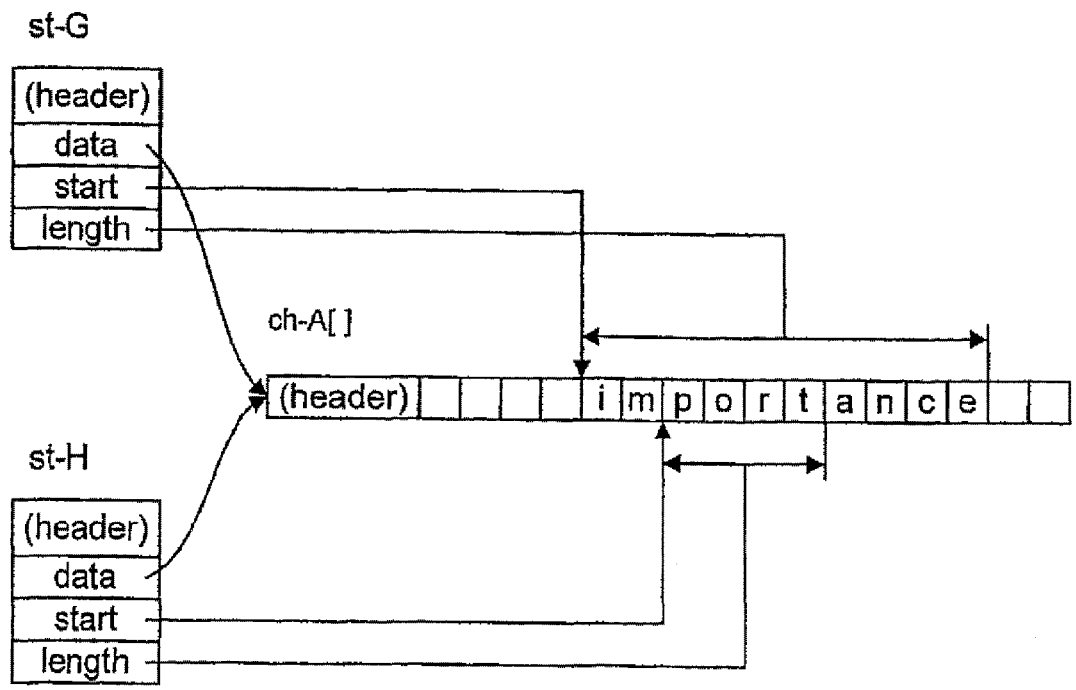

[Figure 13]
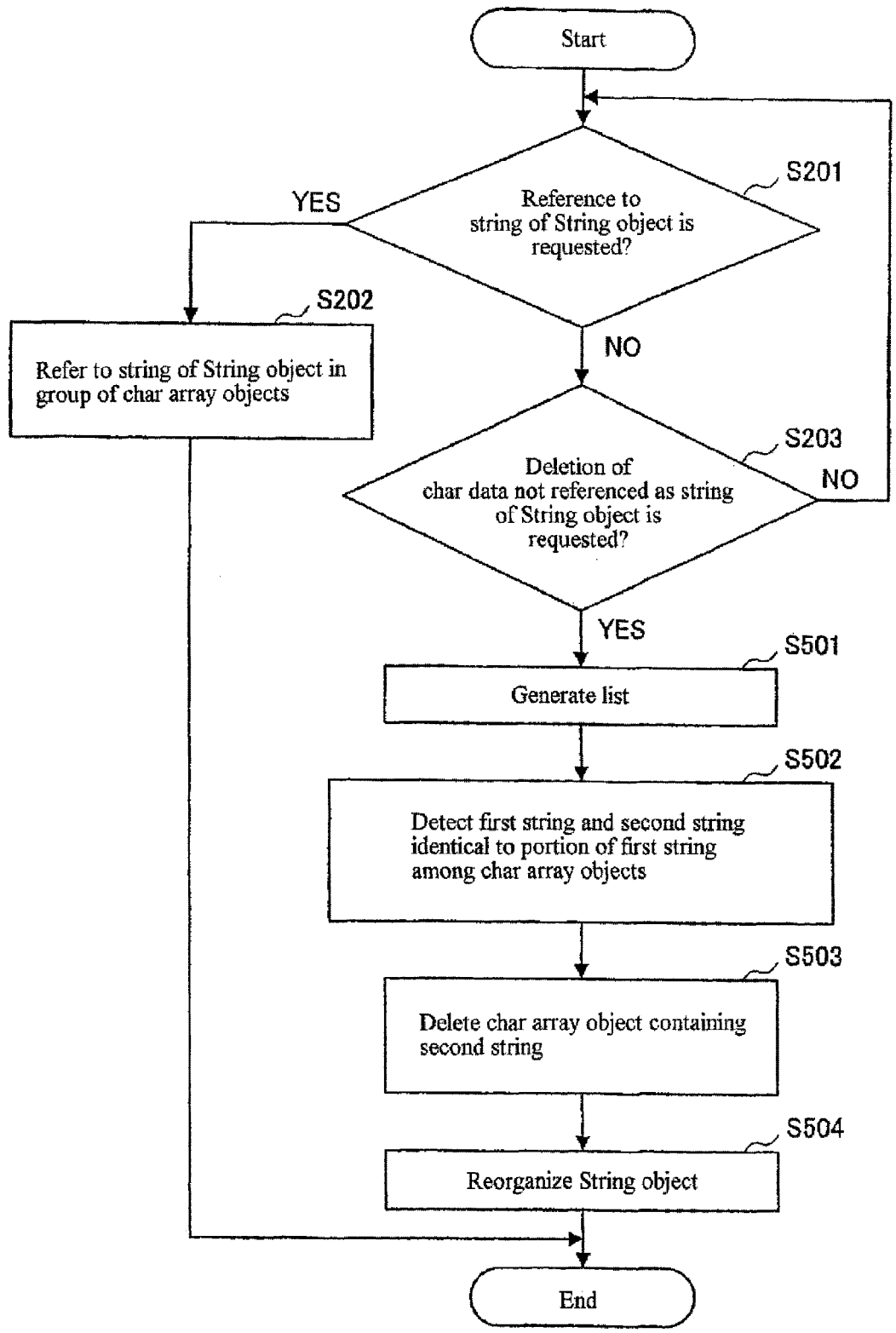

[Figure 14]
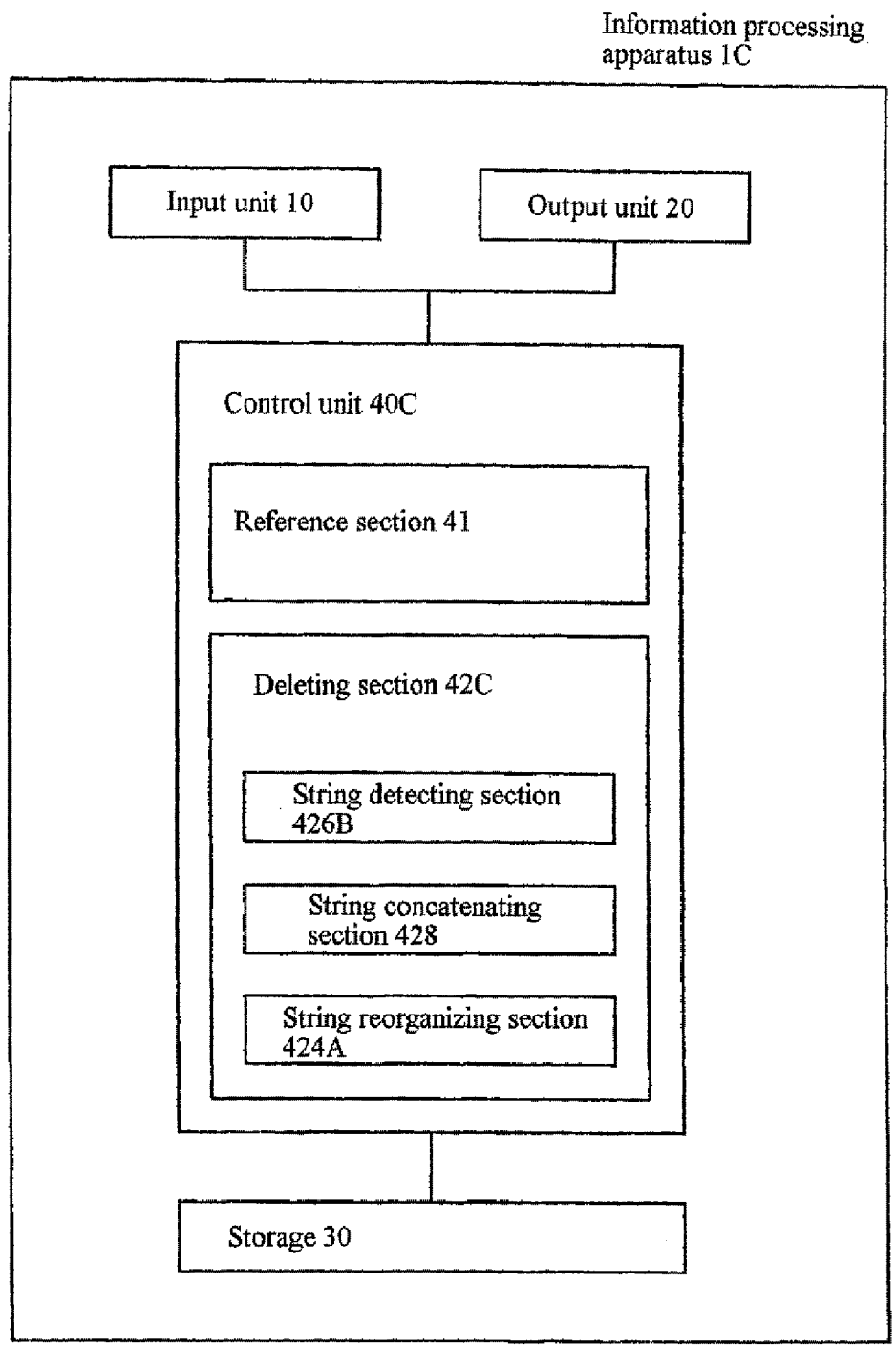

[Figure 15]
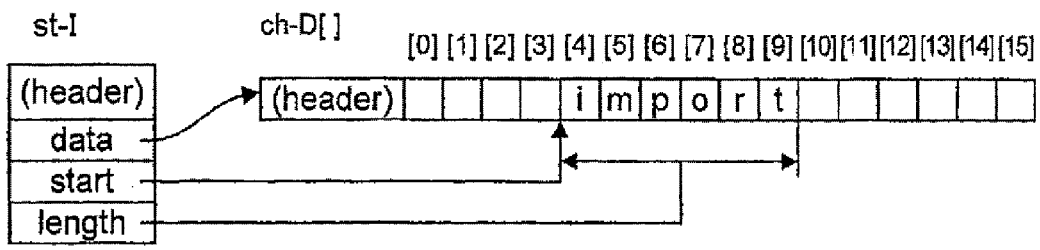
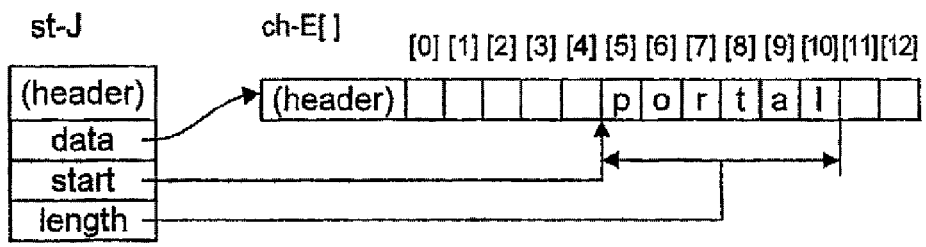
[Figure 16]
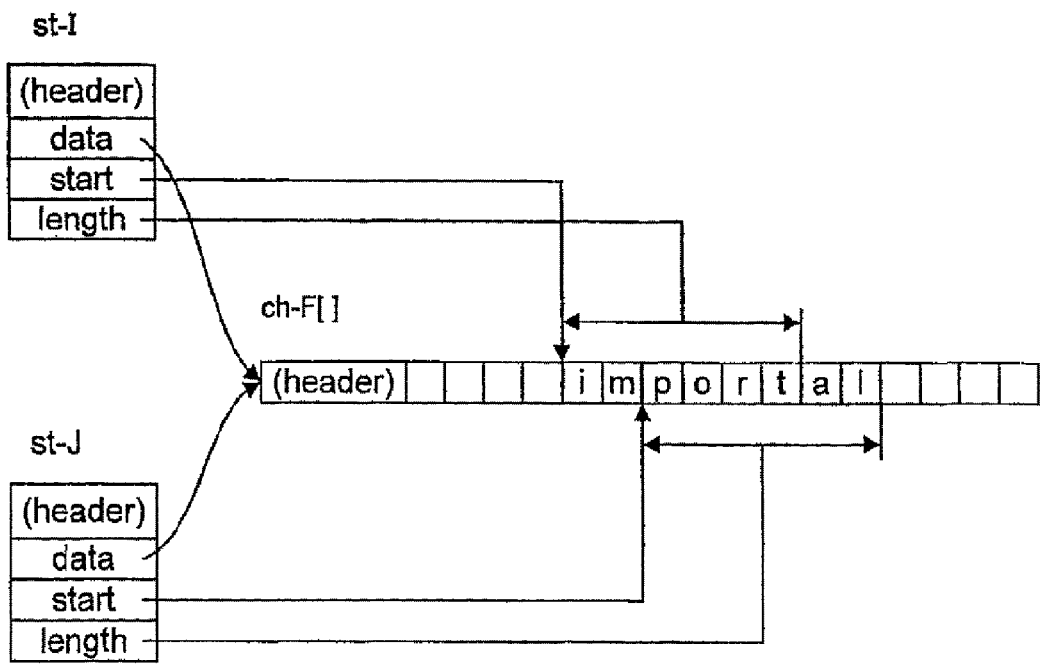

[Figure 17]
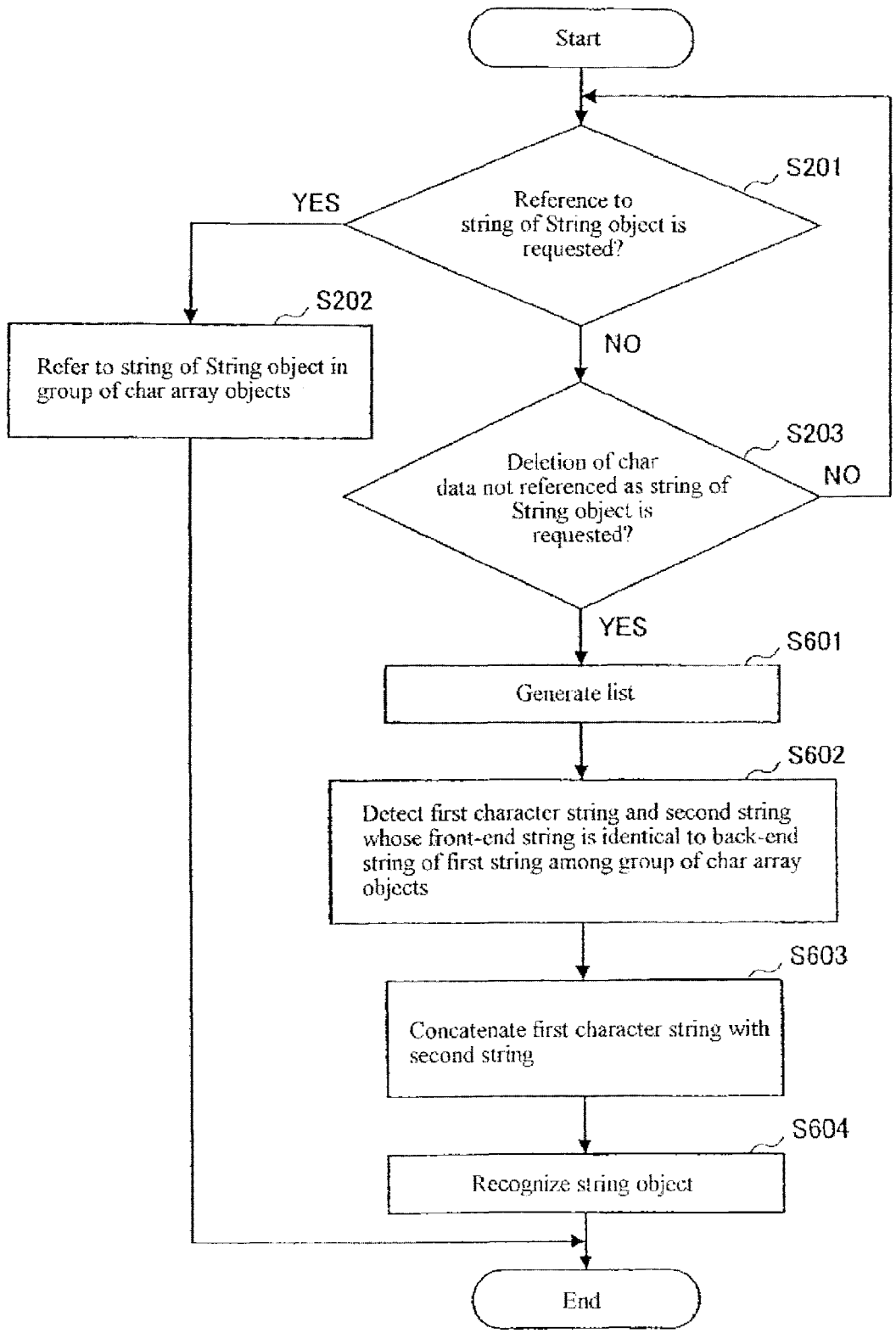

[Figure 18]
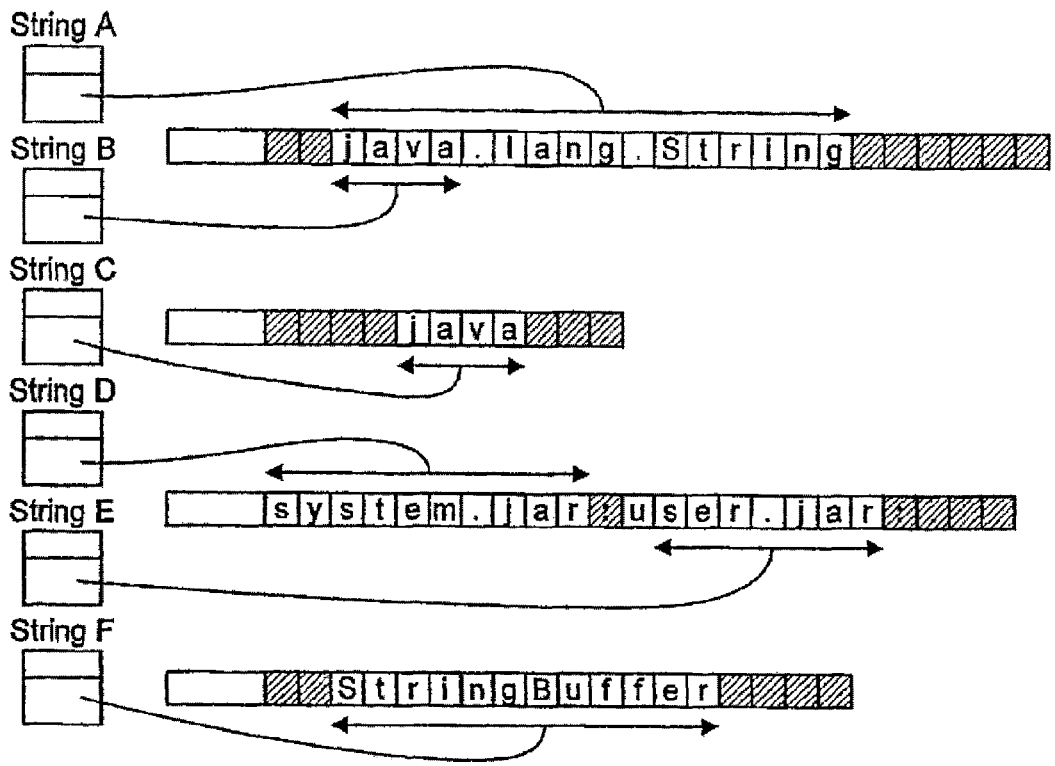
(a) State before the present invention is applied
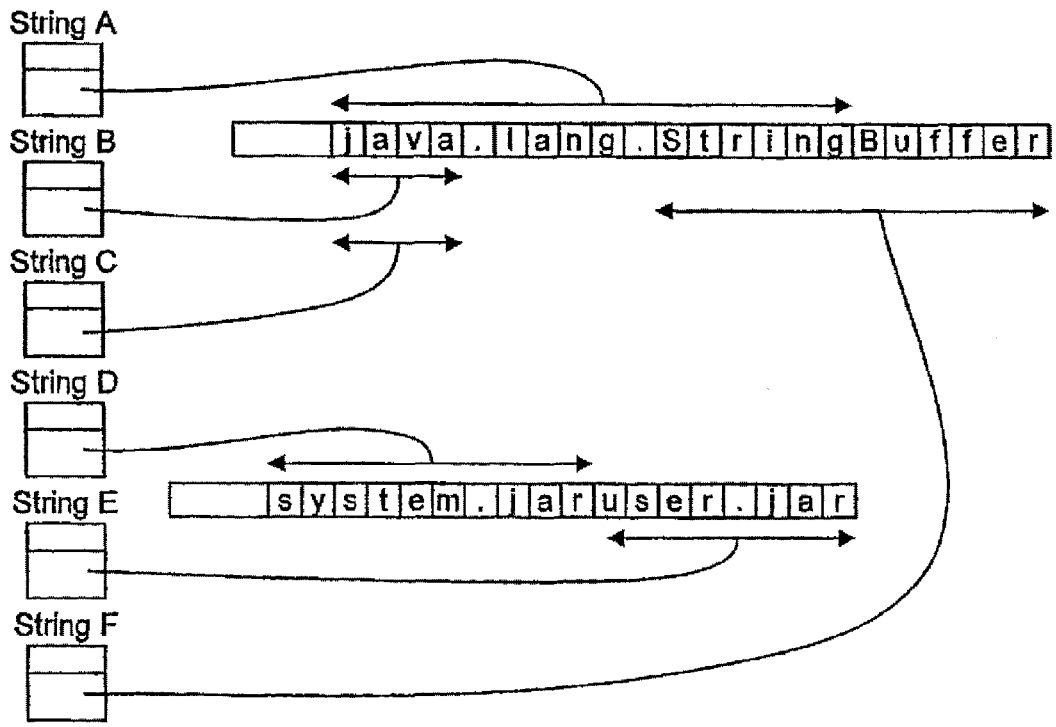
(b) State after the present invention is applied

METHOD TO REDUCE WASTED CHARACTER DATA AREAS OF JAVA STRINGS

CROSS-REFERENCE TO RELATED APPLICATIONS

This application claims priority under 35 U.S.C. §119 to Japanese Patent Application No. 2005-356226 filed Dec. 9, 2005, and under 35 U.S.C. §120 to U.S. patent application Ser. No. 11/608,795 filed Dec. 8, 2006, the entire text of which is specifically incorporated by reference herein.

BACKGROUND OF THE INVENTION

The present invention relates to a method, program, and information processing apparatus for handling strings.

Computers, which are information processing apparatuses, conventionally operate in accordance with a program written in a programming language such as C or Java. The computer stores data such as numeric values and strings used in arithmetic in a memory which is a storage.

For example, in a computer operating in accordance with a Java program written in Java, which is an object-oriented language, garbage collection (hereinafter referred to as GC) that automatically frees a memory area in a memory that stores data that is no longer in use, without intervention of a programmer is used. In one GC implementation, a memory is divided into two memory areas, a first memory area storing a first type of data group having a relatively short lifetime and a second memory area storing a second type of data group having a relatively long lifetime, and GC is executed more frequently on the first memory area than on the second memory area. In this way, GC is limited to a particular memory area in consideration of the characteristics of data, thereby efficiently freeing the memory area.

As described above, a computer operating in accordance with a Java program executes GC to free memory areas to reduce the amount of data stored in a memory used by the computer.

In a typical implementation of an execution environment of the Java program described above, strings represented by String objects are referred to in char array objects. The char array object generally has two characteristics.

A first characteristic is that a char array object may contain char data that is not referenced as a string of a String object. If such a char array object is not referred to by objects other than a String object, it is desirable that the memory area in which the char data that is not referenced as a string of the string object be freed to save the memory space consumed by the computer.

A second characteristic is that there may be multiple char array objects that have the same string data. In Java, strings of String objects cannot be handled. In the above case, it is desirable that two identical char array objects be consolidated into one and the memory area that stores one of the objects be freed to reduce the memory space consumed by the computer.

However, in a computer operating according to a Java program, conventional GC typically cannot detect char data that is not referred to or redundant char array objects described above among a group of char array objects and therefore cannot free memory areas storing these kinds of data. Therefore, there has been a problem that the amount of data stored in a memory used by the computer cannot sufficiently be reduced.

BRIEF SUMMARY OF THE INVENTION

Aspects of the present invention may be used to provide a string handling method, program, and information processing apparatus capable of reducing the amount of data in storage. Character data that is not referred to and overlapping strings are detected and deleted among a group of strings, thereby freeing memory areas storing them. Char data that is not referred to and overlapping char arrays can be detected and deleted among a group of char array objects to free the memory areas storing these kinds of data. Thus, storage space of the storage consumed by the information processing apparatus can be reduced.

According to a first aspect of the present invention, there is provided a string handling method for handling a char array in an information processing apparatus which operates in accordance with a Java program and has a storage storing a group of char array objects, each of which consists of a plurality of pieces of char data, the method including: referring to a string of a String object in the group of char array objects; and deleting a given piece of char data and char array object from the group of char array objects when garbage collection is performed.

According to a second aspect of the present invention, there is provided a string handling method for handling a string in an information processing apparatus having a storage storing a group of strings including a plurality of strings each of which consists of a plurality of pieces of character data, the method including: referring to a particular string in the group of strings; detecting a piece of character data that is not referenced as the particular string among the group of strings; and deleting the detected piece of character data from the group of strings.

According to a third aspect of the present invention, there is provided a string handling method for handling a string in an information processing apparatus having a storage storing a group of strings including a plurality of strings each of which consists of a plurality of pieces of character data, the method including: referring to a particular character string in the group of strings; reordering the plurality of strings in accordance with the plurality of pieces of character data; detecting a first string and a second string identical to the first string in a group of strings including the reordered plurality of strings; and deleting the second string from the group of strings including the reordered plurality of strings.

According to a fourth aspect of the present invention, there is provided a string handling method for handling a string in an information processing apparatus having a storage storing a group of strings including a plurality of strings each of which consists of a plurality of pieces of character data, the method including: referring to a particular string in the group of strings; detecting a first string and a second string identical to a portion of the first string among the group of strings; and deleting the second string from the group of strings.

According to a fifth aspect of the present invention, there is provided a string handling method for handling a string in an information processing apparatus having a storage storing a group of strings including a plurality of strings each of which consists of a plurality of pieces of character data, the method including: referring to a particular string in the group of strings; detecting a first string and a second string whose front-end string including the first piece of character data is identical to a back-end string of the first string including the last piece of character data among the group of strings; and concatenating in the group of strings the first string with the second string by unifying the back-end string with the front-end string.

BRIEF DESCRIPTION OF THE SEVERAL VIEWS OF THE DRAWINGS

FIG. 1 shows a functional block diagram of an information processing apparatus according to a first embodiment of the present invention.

FIG. 2 shows a schematic diagram of a group of strings stored in a storage medium of the information processing apparatus.

FIG. 3 shows a schematic diagram illustrating the relation between a particular string and a group of strings before string handling is performed in a deleting section of the information processing apparatus.

FIG. 4 shows a schematic diagram illustrating the relation between the particular string and the group of strings after the string handling is performed in the deleting section of the information processing apparatus.

FIG. 5 shows a flowchart of an operation of the information processing apparatus.

FIG. 6 shows a functional block diagram of an information processing apparatus according to a second embodiment of the present invention.

FIG. 7 shows a schematic diagram illustrating the relation between a particular string and a group of strings before string handling is performed in a deleting section of the information processing apparatus.

FIG. 8 shows a schematic diagram illustrating the relation between the particular string and the group of strings after the string handling is performed in the deleting section of the information processing apparatus.

FIG. 9 shows a flowchart of an operation of the information processing apparatus.

FIG. 10 shows a functional block diagram of an information processing apparatus according to a third embodiment of the present invention.

FIG. 11 shows a schematic diagram illustrating the relation between a particular string and a group of strings before string handling is performed in a deleting section of the information processing apparatus;

FIG. 12 shows a schematic diagram illustrating relation between the particular string and the group of strings after the string handling is performed in the deleting section of the information processing apparatus;

FIG. 13 shows a flowchart of an operation of the information processing apparatus.

FIG. 14 shows a functional block diagram of an information processing apparatus according to a fourth embodiment of the present invention.

FIG. 15 shows a schematic diagram illustrating the relation between a particular string and a group of strings before string handling is performed in a deleting section of the information processing apparatus.

FIG. 16 shows a schematic diagram illustrating the relation between the particular string and the group of string after the string handling is performed in the deleting section of the information processing apparatus.

FIG. 17 shows a flowchart of an operation of the information processing apparatus.

FIG. 18 shows a schematic diagram showing an example to which a combination of embodiments of the present invention is applied.

DETAILED DESCRIPTION OF THE INVENTION

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Embodiments of the present invention will be described with reference to the accompanying drawings. In the description of the embodiments that follows, like elements are labeled like reference numeral and the description of which will be omitted or simplified.

1. First Embodiment

FIG. 1 is a functional block diagram of an information processing apparatus 1 according to a first embodiment of the present invention. The information processing apparatus 1 is an apparatus that performs information processing, which may be a computer. The effects of the present invention may be implemented by the information processing apparatus 1 executing a program of the present invention. The information processing apparatus 1 includes an input unit 10 which receives inputs from a user, an output unit 20 which outputs the results of operations, a storage 30 which stores a group of char array objects, each consisting of multiple pieces of char data, and a control unit 40 which computes information. The information processing apparatus 1 references a string represented by a String object among the group of char array objects stored in the storage 30 and also detects char data that is not referenced as a string of the String object and deletes the detected char data from the group of char array objects.

The input unit 10 receives an input from a user and provides the input information to the control unit 40. The input unit 10 may be a keyboard and/or mouse, for example.

The output unit 20 outputs the result of processing performed by the information processing apparatus 1. The output unit 20 may be a CRT or liquid-crystal display.

The storage 30 stores an OS (operating system), middleware, and application programs as well as char array objects as strings. The storage 30 may be a memory of the computer.

FIG. 2 is a schematic diagram of a group of char array objects, CHARS, stored in the storage 30. The group of char array objects CHARS includes multiple char array objects ch_A[ ], ch_B[ ], ch_C[ ], chD[ ], and ch_E. Each of the char array objects ch_A[ ]-ch_E[ ] has a header.

The header of each of the char array objects ch_A[ ]-ch_E[ ] contains information about each object that is internally used by the information processing apparatus 1. Each header stores information such as the size of each of the char array object ch_A[ ]-ch_E[ ]. For example, the header of the char array object ch_A[ ] stores the size information "16".

The char array object ch_A[ ] includes char data ch_A[0]-ch_A[15], which is character data. Similarly, the char array objects ch_B[ ]-ch_E[ ] include char data ch_B[0]-chB[13], ch_C[0]-ch_C[6], ch_D[0]-ch_D[10], and ch_E[0]-ch_E[12], respectively. For example the char data ch_B[8] of the char array object ch_B[ ] is "a".

Returning to FIG. 1, the control unit 40 is a central processor, which may be a CPU (Central Processing Unit), performing arithmetic, control and other processing. The control unit 40 includes a reference section 41 and a deleting section 42.

The reference section 41 refers to the string represented by a String object as a particular string among a group of char array objects.

FIG. 3 is a schematic diagram showing the relation between a string represented by a String object st_A and the char array object ch_A[ ] before string handling is performed in the deleting section 42, which will be described later. FIG. 4 is a schematic diagram showing the relation between the string represented by the String object st_A and the char array object ch_A[ ] after the character handling is performed in the deleting section 42, which will be described later.

As shown in FIG. 3, the string represented by the String object st_A refers to the char data ch_A[4]-chA[13], "importance". The String object st_A includes a header, a data section, a start section, and a length (the number of characters) section.

The header of the String object indicates that the object is a String object.

The data section of the String object points to one char array object. In particular, the data section of the String object st_A represents the char array object ch_A[ ] containing the string "importance" represented by the String object st_A. The string represented by the String object is a portion of the char array object the location of which is represented by the remaining two values.

The start section of the String object represents the position in the char array object containing the string represented by the String object at which reference to the string represented by the String object starts. Specifically, the start section of the String object st_A represents "4".

The length section of the String object represents the number of pieces of char data referenced as the string represented by the String object in the char array object containing the string represented by the String object. Specifically, the length section of the String object st_A represents the number of pieces of char data ch_A[4]-ch_A[13], that is, "10".

Implementations other than the implementation described above may also be used as long as they enable a portion of char data of a char array object to be a string represented by a String object. For example, instead of the value of length, an index value of the last char data referred to may be held ("13" in the case of st_A).

Returning to FIG. 1, the deleting section 42 deletes char data that is not referenced as the string represented by the String object from the char array object. The deleting section 42 includes a list generating section 421, a character data detecting section 422, a character data deleting section 423, and a string reorganizing section 424.

The list generating section 421 checks the storage 30 to determine which object refers to a char array in the storage 30, marks strings used as strings in the char data that are represented by String objects, and lists them by char array. In the example in FIG. 3, it is recorded in the char array object ch_A[ ] portion of the list that the char data used as the string represented by the String object is "importance" in ch_A[4]-ch_A[13] and that the String object that refers to the char array object ch_A[ ] is st_A.

If a char array object is referred to by an object other than a String object, the char array object cannot be altered and therefore may be excluded from the list.

The character data detecting section 422 detects char data that is not referenced as a string represented by a String object among a group of the char array objects. In the example shown in FIG. 3, the char data detecting section 422 detects the char data ch_A[0]-ch_A[3] and the char data ch_A[14]-ch_A[15] that are not referenced as the string "importance" of the String object st_A in the char array object ch_A[ ] of the group of char array object CHARS.

The character data deleting section 423 deletes the detected char data from the char array object. In the example shown in FIG. 3, the character data deleting section 423 deletes the char data ch_A[0]-ch_A[3] and the char data ch_A[14]-ch_A[15] detected by the character data detecting section 422, thereby changing the char array object ch_A[ ] as shown in FIG. 4. As a result, the size of the char array object ch_A[ ] is reduced from "16" to "10". Thus, the amount of data in the storage space in the storage 30 consumed by the char array object ch_A[ ] is reduced.

The string reorganizing section 424 alters the char array object in response to the deletion of the char data by the character data deleting section 423 and reorganizes the String object. In the example shown in FIG. 3, the string reorganizing section 424 alters the header of the char array object ch_A[ ] to represent "10", modifies the data section of the String object st_A so as to refer to the altered char array object ch_A[ ] as shown in FIG. 4, and alters the start section to "0" to represent the char data ch_A[0].

Operation of the information processing apparatus 1 described above will be described with reference to FIG. 5. First, at step S201, determination is made as to whether reference to the string represented by the String object is requested. If determination at step S201 is "Yes", the process proceeds to step S202. On the other hand, if determination at step S201 is "No", the process proceeds to step S203. At step S202, the string of the String object in the char array object is referred to.

At step S203, determination is made as to whether deletion of char data that is not referenced as the string represented by the String object from the char array object is requested. If determination at step S203 is "Yes", the process proceeds to step S301; otherwise, the process returns to step S201.

At step S301, each char array is checked for a group of char data used as strings represented by String objects and a group of String objects that reference the char array and they are listed. Then the process proceeds to step S302. If a char array object is referred to by an object other then a String object, the char array object is not listed and excluded from the subsequent processing.

At step S302, char data that is not referenced as a string represented by the String object in the char array object is detected and then the process proceeds to step S303.

At step S303, the char data detected at step S302 is deleted from the char array object and the char array object is reorganized, then the process proceeds to step S304. At step S304, the String object is reorganized.

Since the information processing apparatus 1 according to the first embodiment includes the reference section 41 as has been described above, a string represented by a String object in the char array object stored in the storage 30 can be referred to. Furthermore, the information processing apparatus 1 can detects char data that is not referenced as a string represented by a String object in the char array object stored in the storage 30 and can delete the detected char data. In this way, char data that is not referenced as a string represented by a String object can be deleted from a char array object to reduce the amount of data stored in the storage 30.

GC can generate a mark table that summarizes the referential relation between objects and can detect an object that is not referenced by any object on the basis of the mark table. By checking for char data that is not referenced as a string of a String object in that process, the efficiency of the listing at step S301 can be improved.

GC typically has a mechanism capable of searching for a group of objects referencing the objects in order to cause objects that have not been collected to operate. Techniques such as reverse pointer chasing can be used as the mechanism. The arrangement for recording a group of String objects that reference char array objects in the list generated at step S301 can use this mechanism to improve the efficiency of the recording.

Steps S301 through S304 for deleting char data that is not referenced as a string represented by the String object from the char array object may be performed on all char array objects at a time or may be performed on each char array object individually. That is, the sequence of the steps can be performed on each char array object independently.

Information about a group of char data used in each char array in the list generated by the list generating section 421 may be simplified down to the index value of the first char data and the index value of the last char data in the char date of the char array object. With this, if char data that is not used exists in between, the char data cannot be deleted but, on the other hand, the amount of data listed is reduced and therefore the memory space consumed for storing the list can be reduced.

2. Second Embodiment

FIG. 6 is a functional block diagram of an information processing apparatus 1A according to a second embodiment of the present invention. The information processing apparatus 1A differs from the information processing apparatus 1 shown in FIG. 1 in the configuration of its control section. The information processing apparatus 1A refers to a string represented by a String object in char array objects stored in a storage 30 and detects a first string and a second string that is identical to the first string and deletes the char array object constituting the second string.

The control unit 40A of the information processing apparatus 1A includes a reference section 41 and a deleting section 42A. The deleting section 42A includes a string ordering section 425, a string detecting section 426, a string deleting section 427, and a string reorganizing section 424A.

FIG. 7 is a schematic diagram showing the relation between strings represented by String objects st_E and st_F and char array objects ch_A[ ] and ch_B[ ] before string handling is performed in the deleting section 42A. FIG. 8 is a schematic diagram showing the relation between the strings represented by the String objects st_E and st_F and the char array object ch_A[ ] after the string handling is performed in the deleting section 42A.

Returning to FIG. 6, the string ordering section 425 generates a list of char arrays according to data in the portion of a char array object that is used as a string represented by a String object. For example, the string ordering section 425 arranges char arrays in ascending order according to the char data constituting each char array.

The string detecting section 426 detects a first string and a second string that is identical to the first string in a group of char array objects. In the example shown in FIG. 7, the string detecting section 426 detects the string "importance" of the char array object ch_A[ ] as the first string and the string "importance" of the char array object ch_B[ ] as the second string. It should be noted that if a number of identical strings are detected, one of the identical strings is chosen as the first string and the other identical strings are chosen as the second strings. For example, if four identical strings are detected, one of the four identical strings is chosen as the first string and the other three strings are chosen as the second strings.

The string deleting section 427 deletes a char array object containing the second string described above from the group of char array objects. In the example in FIG. 7, the string deleting section 427 deletes the char array object ch_B[ ] as the second string identical to the string "importance".

The string reorganizing section 424A reorders the String object in response to the deletion of the second string by the string deleting section 427. In the example shown in FIG. 7, the string reorganizing section 424A modifies the data section of the String object st_F so as to refer to the char array object ch_A[ ] as shown in FIG. 8 and alters the start section to "4" to represent the char data ch_A[4] of the char array object ch_A[ ] as shown in FIG. 8.

Operation of the information processing apparatus 1A will be described with reference to FIG. 9. At step S401, a list of char arrays rearranged from the String object in accordance with char data used in a string object is generated, and then the process proceeds to step S402. At step S402, a first string and a second string identical to the first string are detected among char array objects, then the process proceeds to step S403. It should be noted that because the list of the char arrays rearranged according to the char data has been generated at step S401, the first and second strings can be readily detected as compared with the case where the char arrays are not rearranged.

At step S403, the char array object containing the second string is deleted from the group of char array objects and then the process proceeds to step S404. At step S404, the String object is reorganized.

It should be noted that deletion of the char array object containing the second string at step S403 may be omitted and only the reorganization of the String object at step S404 may be performed. The reorganization eliminates the objects referencing the char array object containing the second string, and the objects can be collected by conventional GC.

Since the information processing apparatus 1A according to the second embodiment includes the deleting section 42A as has been described above, a first string and a second string identical to the first string can be detected from a group of char array objects stored in the storage 30 and the char array object that contains the second string can be deleted. In this way, the number of redundant strings can be reduced and the amount of data stored in the storage 30 can be reduced accordingly.

3. Third Embodiment

FIG. 10 is a functional block diagram of an information processing apparatus 1B according to a third embodiment of the present invention. The information processing apparatus 1B differs from the information processing apparatus 1A in FIG. 6 in the function of the string detecting section. The information processing apparatus 1B refers to a string represented by a String object among a group of char array objects stored in a storage 30, detects a first string and a second string identical to a portion of the first string, and deletes the second string.

A control unit 40B of the information processing apparatus 1B includes a reference section 41 and a deleting section 42B. The deleting section 42B includes a string detecting section 426A, a string deleting section 427, and a string reorganizing section 424A.

FIG. 11 is a schematic diagram showing the relation between strings of String objects st_G and st_H and char array objects c_A[ ] and ch_C[ ] before string handling in the deleting section 42B is performed. FIG. 12 shows the relation between the strings of the String objects st_G and st_H and the char array object ch_A[ ] after the string handling in the deleting section 42B is performed.

Returning to FIG. 10, the string detecting section 426A detects a first string and a second string identical to a portion of the first string among a group of char array objects. In the example shown in FIG. 11, the string detecting section 426A detects the string "importance" of the char array object ch_A[ ] as the first string and the string "port" of the char array object ch_C[ ] as the second string among the group of char array objects CHARS.

The string deleting section 427 deletes the second string. For example, it deletes the char array object ch_C[ ] as the second string in FIG. 11.

The string reorganizing section 424A reorganizes the String object in response to the deletion of the second string by the string deleting section 427. In the example in FIG. 11, the string reorganizing section 424A modifies the data section of the String object st_H so as to refer to the char array object ch_A[ ] and alters the start section to "6" to represent the char data ch_A[6] of the char array object ch_A[ ] as shown in FIG. 12.

Operation of the information processing apparatus 1B descried above will be described with reference to FIG. 13. At step S501, for each char array, a list of strings used in String objects and a group of String objects that refer to the char array is generated. Then the process proceeds to step S502, where a first string and a second string that is identical to a portion of the first string are detected from the group of char array objects listed. Then the process proceeds to step S503.

At step S503, the char array object that contains the second string is deleted from the group of char array objects and then the process proceeds to step S504, where the String object is reorganized.

It should be noted that the deletion of the char array object containing the second string at step S503 may be omitted and only the reorganization of the String object at step S504 may be performed. The reorganization eliminates the object that references the char array object containing the second string, and the object can be collected by using conventional GC.

Since the information processing apparatus 1B according to the third embodiment includes the deleting section 42B as has been described above, a first string and a second string identical to a portion of the first string can be detected among the char array objects stored in the storage 30 and the char array object that contains the second string can be deleted. In this way, the number of redundant strings can be reduced, thereby reducing the amount of data stored in the storage 30.

4. Fourth Embodiment

FIG. 14 is a functional block diagram of an information processing apparatus 1C according to a fourth embodiment of the present invention. The information processing apparatus 1C differs from the information processing apparatus 1A in the configuration of the control unit. The information processing apparatus 1C refers to a string represented by a String object among a group of char array objects stored in a storage 30, detects a first string and a second string whose front-end string including the first char data is identical to the back-end string of the first string including the last char data of the first string and concatenates the first character string with the second string by unifying the back-end string and front-end string.

A control unit 40C of the information processing apparatus 1C includes a reference section 41 and a deleting section 42C. The deleting section 42C includes a string detecting section 426B, a string concatenating section 428, and a string reorganizing section 424A.

FIG. 15 is a schematic diagram showing the relation between strings of String objects st_I and st_J and char array objects ch_D[ ] and ch_E[ ] before string handling is performed in the deleting section 42C. FIG. 16 is a schematic diagram showing the relation between the strings of the String objects st_I and st_J and a char array object ch_F[ ] after the string handling is performed in the deleting section 42C.

Returning to FIG. 14, the string detecting section 426B detects in char array objects a first string and a second string whose front-end string including the first character data is identical to the back-end character string of the first string including the last character data. For example, the back-end character string "port" of the string "import" is identical to the front-end string "port" of the string "portal". Therefore, in the example in FIG. 15, the string "import" of the char array object ch_D[ ] as the first string and the string "portal" of the char array object ch_E[ ] as the second string are detected among the group of char array objects CHARS.

The string concatenating section 428 concatenates the first string with the second string by consolidating the front-end string and the back-end string into one. In the example in FIG. 15, the string concatenating section 428 unifies the back-end string "port" of the string "import" of the char array object ch_D[ ] and the front-end string "port" of the string "portal" of the char array object ch_E[ ] to concatenate the string "import" of the char array object ch_D[ ] with the string "portal" of the char array object ch_E[ ] into the string "importal" of the char array object ch_F[ ] as shown in FIG. 16.

The string reorganizing section 424A reorganizes the char array object in response to the concatenation of the strings by the string concatenating section 428. For example, the string reorganizing section 424A modifies the data sections of the String objects st_I and st_J in FIG. 15 to refer to the char array object ch_F[ ] as shown in FIG. 16 and alters the start sections to "4" and "6" to represent the char data ch_F[4] and ch_F[6], respectively, of the char array object ch_F[ ].

Operation of the information processing apparatus 1C will be described with reference to FIG. 17. At step 601, for each char array, a list of strings used in String objects and a group of String objects that reference the char array is generated from a String object. Then the process proceeds to step S602, where a first string and a second string whose front-end string including the first char data is identical to a back-end string of the first string including the last char data are detected in the char array objects on the list. Then the process proceeds to step S603.

At step S603, the front-end string and the back-end string are unified to concatenate the first string with the second string. Then, the process proceeds to step S604, where the String object is reorganized.

Since the information processing apparatus 1C according to the fourth embodiment includes the deleting section 42C as has been described, a first string and a second string whose front-end string is identical to the back-end string of the first string can be detected among a group of char array objects stored in the storage 30 and concatenated by unifying the front-end string with the back-end string. Thus, the number of overlapping strings can be reduced and therefore the amount of data stored in the storage 30 can be reduced.

While the present invention has been described with respect to preferred embodiments thereof, the technical scope of the present invention is not limited to the embodiments described above. Various modifications and improvements can be made to the embodiments described above. It will be apparent from the Claims that such modified or improved embodiments are also fall within the technical scope of the present invention. For example, the present invention may be a combination of features of any of the embodiments described above.

FIG. 18 shows an example to which a combination of the embodiments is applied. Part (a) of FIG. 18 shows a state of a storage 30 before the present invention is applied and part (b) shows a state of the storage 30 after the present invention is applied.

As mentioned above, the present invention can be implemented by a program on any of the information processing apparatuses 1, 1A, 1B, and 1C. The storage medium storing the program may be an electronic, magnetic, optical, electromagnetic, infrared, or semiconductor system (or apparatus or equipment) or a propagation medium. Examples of the computer-readable medium include a semiconductor or solid state storage device, a magnetic tape, a removable computer diskette, a random access memory (RAM), a read-only memory (ROM), a rigid magnetic disk, and an optical disc. Examples of the optical disk as of this point in time include a compact-disc read-only memory (CD-ROM), a compact-disc read/write (CD-R/W), and a DVD.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. An apparatus comprising:
a non-transitory computer readable medium storing usable program code to perform the steps of:
referring to a first particular string in a group of strings, the group of strings including a plurality of strings each of which consists of a plurality of pieces of character data;
detecting a first string and a second string whose front-end string including a first piece of character data is identical to a back-end string of the first string including a last piece of character data among the group of strings; and
concatenating in the group of strings the first string with the second string by unifying the back-end string with the front-end string.

2. The computer program according to claim 1, wherein the program code further performs the steps of:
reordering the plurality of strings in accordance with the plurality of pieces of character data; and
deleting the second string from the group of strings including the reordered plurality of strings.

3. A computer program embodied in a non-transitory computer readable memory for causing a computer having a storage storing a group of strings including a plurality of strings each of which consists of a plurality of pieces of character data to handle the strings, the computer program causing the computer to perform the steps of:
referring to a first particular string in the group of strings;
detecting a piece of character data that is not referenced as the particular string among the group of strings independent of frequency of string use; and
deleting the detected piece of character data from the group of strings.

4. The computer program according to claim 3, wherein the computer program further causing:
reordering the plurality of strings in accordance with the plurality of pieces of character data; and
deleting the second string from the group of strings including the reordered plurality of strings.

5. An information processing apparatus including storage, the storage storing a group of strings including a plurality of strings each of which consists of a plurality of pieces of character data and handles the strings, the apparatus comprising:
a non-transitory computer readable medium storing usable program code, the program code including:
a reference section referring to a particular string in the group of strings;
a first detecting section detecting a first string and a second string whose front-end string including a first piece of character data is identical to a back-end string of the first string including a last piece of character data among the group of strings; and
a concatenating section concatenating in the group of strings the first string with the second string by unifying the back-end string with the front-end string.

6. The information processing apparatus according to claim 5, comprising:
a reordering section reordering the plurality of strings in accordance with the plurality of pieces of character data;
a second detecting section detecting a first string and a second string identical to the first string in a group of strings including the reordered plurality of strings; and
a deleting section deleting the second string from the group of strings including the reordered plurality of strings.

7. The information processing apparatus according to claim 6, comprising:
a third detecting section detecting a first string and a second string identical to a portion of the first string among the group of strings.

8. The information processing apparatus according to claim 6, comprising:
a third detecting section detecting a first string and a second string whose front-end string including the first piece of character data is identical to a back-end string of the first string including the last piece of character data among the group of strings; and
a concatenating section concatenating in the group of strings the first string with the second string by unifying the back-end string with the front-end string.

* * * * *